Oct. 17, 1939.                S. W. BORDEN                2,176,757
                            SHEATH CURRENT METER
                            Filed April 2, 1938

Inventor
Steffen W. Borden

Patented Oct. 17, 1939

2,176,757

UNITED STATES PATENT OFFICE 2,176,757

SHEATH CURRENT METER

Stephen W. Borden, Summit, N. J.

Application April 2, 1938, Serial No. 199,628

5 Claims. (Cl. 175—183)

This invention pertains to equipment for shunting swing current from a cable sheath and for determining the polarity of the same and to the combination of such a device with other equipment whereby the presence of a tracer current in a lead-encased conductor may be detected regardless of the amount or polarity of such tracer current which may be flowing at the same time in the lead sheath surrounding the conductor.

A detailed exposition of the use of swing current and swing current meters for testing purposes will be found in my co-pending application, Serial No. 199,625.

One object of the equipment is to provide a device which is suitable for operation on swing current but non-sensitive to direct current. Another object is to provide a cable shunt which is easily adaptable and attachable to various sizes and shapes of cable sheath and adaptable to shunting various lengths of sheath. Another object is to provide equipment for the purpose which is much more sensitive than any equipment heretofore available. Another object is to provide equipment which not only indicates the presence of tracer current in the sheath but the relative direction in which it is flowing. Another object is to provide means for associating the sheath current detector with another detector whereby the presence of tracer current in a conductor within the lead sheath may be detected, regardless of the presence of the same current in the sheath, by observing the relationship between the potentials produced by the two respective detectors.

Figure 1:
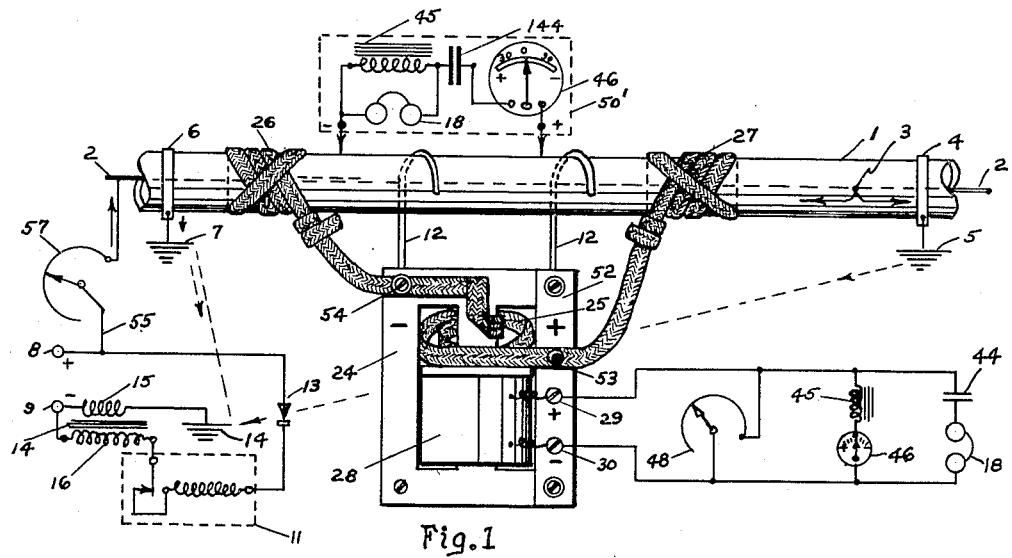
Figure 2:
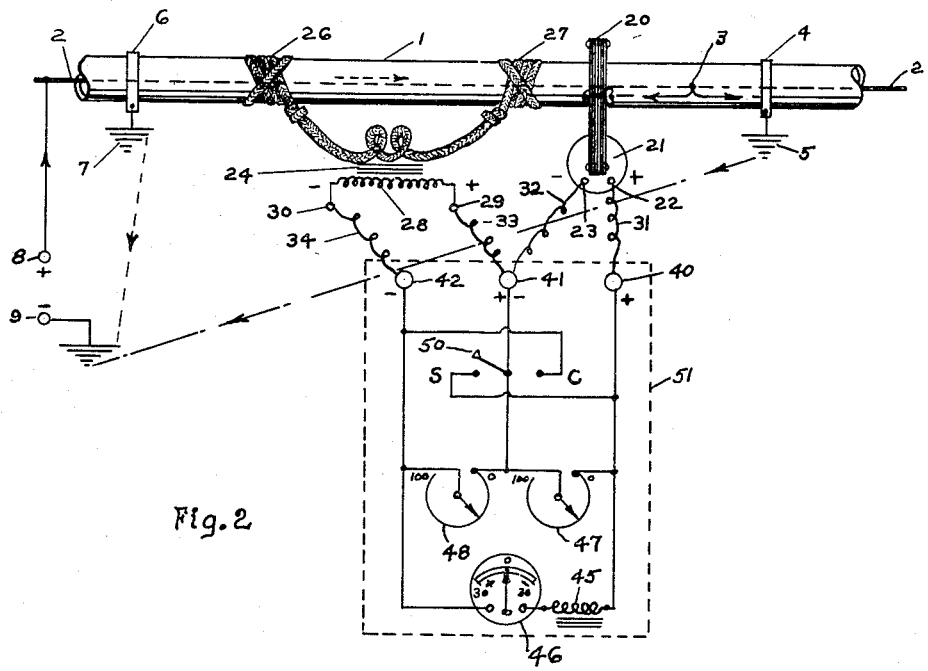
Figure 3:
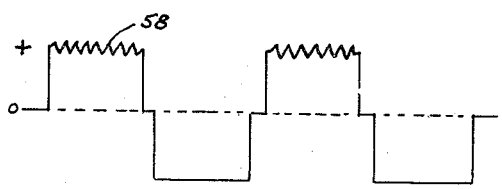

In the drawing, which is schematic only, Fig. 1 represents the sheath current detector attached to a cable and arranged for independent operation, and Fig. 2 shows the sheath current detector arranged for cooperative operation with a conductor pickup coil. Fig. 3 illustrates the wave form of the test current used in Fig. 1.

Referring to the drawing, Fig. 1. 24 is an iron core having means, as 12, for suspending it from a cable sheath. Wound on this core is a coil 25 consisting of several turns which are insulated from each other. For simplicity's sake, the turns are here shown as air insulated but in actual construction they are insulated with ordinary insulating paper or cloth. The winding consists of a flat braided copper conductor, the size which I generally use being about ½" wide by ⅛" thick and having a conductivity substantially equal to that of No. 6 A. W. G. copper wire. This braided conductor extends beyond the ends of the coil, in one continuous piece, to whatever length may be desired, a length of approximately 4 ft. on each side of the coil being about the maximum desirable. One end of the coil is attached to core 24, as by fastener 54 which need not be insulated, while the other end of the coil is secured by fastener 53 to a strip of insulating material 52 which, in turn, is secured to the core 24.

Also mounted on the core 24 is a high-resistance, high-voltage coil 28, the terminals of which are connected to posts 29 and 30 mounted on the strip of insulating material 52. 2 is an insulated conductor contained within a lead sheath 1 and which is grounded to sheath 1 by a fault indicated by 3. Binding posts 8 and 9 are connected to a source of swing current. 14 is a transformer having a primary winding 15 and a secondary winding 16; 11 is a buzzer, and 13 a one-way rectifier element. 46 is a swing meter, 45 a choke coil in series with the meter, 48 a volume control, 44 a condenser, and 18 a telephone receiver.

The equipment is shown connected up for the purpose of detecting tracer current flowing in the sheath 1 and determining its relative polarity. For the purpose, I employ a swing current which, starting from post 8, flows to conductor 2 via rheostat 57, thence through the conductor to fault 3, thence through the lead sheath 1 to bond connections 4 and 6 and thence through the earth to coil 15, and thence to post 9. I prefer a tracer current of about 1.2 cycles per second and a wave form similar to that shown in Fig. 3. The braided conductor is attached to the lead sheath substantially as shown, the space between 26 and 27 being as great as may be feasible. The result of this connection is to shunt a portion of any sheath current which may be flowing in the sheath through coil 25, which produces a flux in core 24, which in turn produces a potential in coil 28, which in turn causes swing meter 46 to swing back and forth in step with the swing current. Volume control 48 is used for keeping the current flow through the meter within proper limits. So far, we have equipment for detecting a flow of current in the cable sheath but not for determining its relative polarity.

Coil 16 of transformer 14 is in series with buzzer 11 and rectifier 13, the whole being connected across posts 8 and 9. When the swing current polarity on post 8 is positive, current flows through rectifier 13, buzzer 11 and winding 15 which causes the buzzer to operate, which in turn produces an alternating current in coil 15 having a frequency determined by the speed of the buzzer, and the potential from coil 15 superimposes the ripple 58 on the positive half of the swing current cycle. When the swing current polarity reverses, the current will not flow through the rectifier 13 and consequently the buzzer does not operate and there is no ripple superimposed in the negative half cycle. By connecting a telephone receiver 18 via condenser 44 across the coil 28, this ripple is distinctly heard in the phone; and if it is heard when the needle on 46 is swinging toward the plus sign, it indicates that terminal 53 is positive for that half of the cycle, which indicates, in turn, that the sheath current is flowing in the direction from 27 to 26 when post 8 is positive whereas if the ripple is heard on the negative side of the meter swing it indicates that 53 is negative and the flow is from 26 toward 27.

In locating a fault, as 3, a tracer current is introduced into conductor 2 usually at the end where the conductor ordinarily receives its operating current, that is, at the supply end of the conductor, and the tracer current is considered to be flowing from the supply end toward the fault, regardless of the fact that it may be an alternating current; and since tracer current which returns by way of the lead sheath of the cable always flows away from the fault 3, then if the points 26 and 27 are on a part of the sheath which is between the end where the tracer current is applied and the fault, 53 will be positive whereas if 26 and 27 are beyond the fault, as between 3 and 4, then 53 will be negative.

If, instead of swing current, plain direct current is used and a millivoltmeter be connected between points 26 and 27, the same information may be obtained but there may be flowing in sheath 1, direct current such as railway return current, whose magnitude may be many times that of the tracer current, with the result that the readings are rendered useless or there may be alternating current flowing in the sheath which might have the same effect. As fully set forth in my co-pending application, Serial No. 199,625, the swing current test is not subject to interference by either direct or alternating stray current in the cable sheath; and the equipment as a whole is much more sensitive than any other type of portable equipment having sufficient ruggedness for the purpose.

The transforming device 24 is used for the double purpose of increased sensitivity and for preventing a flow of direct current from the cable sheath into meter 46. However, if the swing current in the cable sheath 1, or in any other conductor, is of sufficient magnitude, its presence and polarity may be detected by connecting meter 46 directly across a portion of the conductor, as shown in the dotted enclosure 50'. When connected in this manner, a condenser 144 is inserted to block out direct current and the telephone 18 may be shunted across the choke coil 45.

The resistance of fault 3 varies greatly in different instances and may be anything from a few ohms to several hundred thousand ohms; and, furthermore, it may very greatly even during the test period; and this, in turn, means that the amount of tracer current flowing may vary over rather wide limits and also that it is convenient to make the tracer circuit voltage variable. These variables introduce considerable difficulties in the way of superimposing a ripple current on one-half of the swing current wave, and for this and other reasons the equipment shown in Fig. 2 is sometimes more desirable for the purpose of locating a cable fault.

Referring now to Fig. 2. 51 is a portable meter device which includes the swing meter 46 with its choke coil 45 in series. There are three binding posts, 40, 41, and 42. Post 40 is connected to one side of meter 46 via choke coil 45, and connected between 40 and 41 is a volume control 47. Post 42 is connected to the other side of meter 46, and between 41 and 42 a second volume control 48 is connected. A single pole, double throw switch 50 is arranged to short-circuit either posts 40 and 41 or 41 and 42. Posts 41 and 42 are connected via flexible leads 33 and 34 to the terminals 29 and 30 of the coil 28 of a sheath current transformer 24, and posts 40 and 41 are connected via flexible leads 31 and 32 to terminals 22 and 23 of coil 21 which is mounted on a flexible iron core 20 which encircles the lead sheath 1. A detailed description of the construction and operation of devices 20 and 21 will be found in my co-pending application, Serial No. 199,627.

For locating the fault 3, tracer current from terminal 8 flows from the conductor 2 to the fault 3 from which it passes into lead sheath 1. We will assume that a 2-ampere tracer current is used and that one ampere flows through the lead sheath from 3 to the bond connection 6 from which it returns to post 9 via ground 7. The balance of the current flows from 3 to bond 4, thence through the ground 5 back to post 9.

The test is made as follows. Switch 50 is first thrown to position C which short-circuits coil 28, leaving only coil 21 active. Rheostat 47 is adjusted so as to produce a swing on meter 46 of not more than half scale. The switch is now thrown to position S which short-circuits coil 21, leaving coil 28 alone active, and rheostat 48 is adjusted to produce substantially the same swing on meter 46 as that previously produced by coil 21. Switch 50 is now opened, and if the polarity of coils 21 and 28 are the same, the resulting swing on meter 46 will be greater than the swings on either of the coils individually, and if the polarities are opposite, the resulting swing will be approximately equal to the difference. Another method of determining whether the coils are adding or bucking is to make the adjustments as previously outlined and then throw switch 50 quickly from one position to the other and note whether the hand merely continues to swing or whether it comes to rest and reverses the direction of swing, which latter effect will be present if the coils are bucking. This method will be found very effective when the conditions of test are such that it is possible to have only a very small deflection on meter 46. It will be understood that the magnitude and polarity of the potential of coil 21 is determined by the effective current threading coil 20 which current is the difference between the current in conductor 2 and that flowing in the sheath.

The interpretation of the readings obtained from the meters is as follows, having in mind that the purpose of the test is to follow the tracer current in conductor 2 from its point of origin 8 along the cable to the fault 3 for the purpose of locating the fault, it being obvious that there will be no current flowing in conductor 2 at any point beyond the fault. If neither coil produces a deflection on the meter, there is no current in conductor 2. If either coil produces a deflection and the other coil does not, there is current in conductor 2. If each coil produces a deflection, then if the coil polarities are additive, there is no current in the conductor; and if the polarities are opposed, there is current in the conductor. All the foregoing applies whether the point of test be ahead of the fault or beyond the fault, and it will be clear that the current in the conductor may be traced regardless of counterflow in the cable sheath.

While I have described certain features more or less in detail, it will be understood that the invention will employ various devices of differing forms and construction and it is to be understood that the invention is not to be limited except by the scope of the appended claims taken in conjunction with the state of the prior art.

What I claim is:

1. A sheath current detector which includes a transformer having a primary winding for connection across a length of cable sheath and a secondary winding connected to an indicating device responsive to flux in the transformer core; adjustable, flexible, single means for contacting and attaching to the cable sheath and flexible leads joining the contacting means to the terminals of the primary winding, the winding, the leads, and the contacting and attaching means all being constructed of one continuous length of flat braided copper conductor.

2. Means for detecting swing current in a conductor and for determining its polarity which includes a transformer having a primary winding for connection to two points on the conductor between which a difference of potential exists due to the flow of swing current, a secondary winding on the transformer to the terminals of which is connected an indicating device responsive to swing current potential generated by the secondary winding, a telephone receiver responsive to relatively high frequency current connected to the secondary winding and means for superimposing a relatively high frequency alternating current on one half of the wave of the swing current.

3. Means for detecting the presence of swing current in a cable sheath and for determining its relative polarity which includes a transformer having a primary winding shunted across a length of the sheath and a secondary winding across the terminals of which is connected a swing current indicator and a telephone receiver; a source of swing current and interconnecting leads forming a circuit which includes the cable sheath and one winding of a second transformer; a second transformer having one winding for connection in the said circuit; an electromagnetic interruptor, as a buzzer, having its operating coil connected to the source of swing current via a half wave rectifier; a second winding on the second transformer which winding is connected to receive current from the swing current source and via the buzzer in such manner that the current flow in the winding has the same frequency as the current in the operating coil of the buzzer.

4. Means for detecting the presence of swing current in a conductor and for determining its polarity which includes a swing meter, a condenser, and a choke coil all connected in series and connected to two points along the conductor between which a difference of potential exists, a telephone receiver shunted across the choke coil, and means for superimposing a high frequency ripple on one half of the swing current wave.

5. A sheath current detector which includes; a transformer having a primary winding for connection across a length of cable sheath and a secondary winding connected to a swing current meter which has a choke coil in series therewith; adjustable, flexible, single means for contacting and attaching to the cable sheath and for flexible leads joining the contacting means to the primary winding; the winding, the leads and the contacting and attaching means all being embodied in one continuous length of flat, braided copper conductor.

STEPHEN W. BORDEN.